United States Patent [19]

Honey et al.

[11] Patent Number: 4,734,863

[45] Date of Patent: Mar. 29, 1988

[54] APPARATUS FOR GENERATING A HEADING SIGNAL FOR A LAND VEHICLE

[75] Inventors: Stanley K. Honey, Newark; Kenneth A. Milnes, Fremont; Walter B. Zavoli, Palo Alto, all of Calif.

[73] Assignee: Etak, Inc., Menlo Park, Calif.

[21] Appl. No.: 708,741

[22] Filed: Mar. 6, 1985

[51] Int. Cl.[4] .............................................. G06F 15/50
[52] U.S. Cl. .................................... 364/449; 364/457; 364/571; 340/988; 33/356
[58] Field of Search ............... 364/449, 450, 454, 457, 364/460, 559, 571, 572; 340/988, 995; 33/356, 361

[56] References Cited

U.S. PATENT DOCUMENTS

| | | | |
|---|---|---|---|
| 3,303,335 | 2/1967 | Pryor | 364/572 |
| 3,849,636 | 11/1974 | Helms | 364/450 |
| 4,032,758 | 6/1977 | Lewis | 364/457 |
| 4,091,543 | 5/1978 | Lapeyre | 364/571 |
| 4,247,898 | 1/1981 | Bosselaers | 364/460 |
| 4,351,027 | 9/1982 | Gay et al. | 364/449 |
| 4,521,777 | 6/1985 | Nakamura et al. | 33/356 |
| 4,524,357 | 6/1985 | Nakamura et al. | 33/356 |
| 4,555,761 | 11/1985 | Matsumoto et al. | 364/449 |
| 4,593,359 | 6/1986 | Sadeh | 364/449 |
| 4,622,754 | 11/1986 | Chujo et al. | 33/361 |

Primary Examiner—Gary Chin
Attorney, Agent, or Firm—Fliesler, Dubb, Meyer & Lovejoy

[57] ABSTRACT

Disclosed is an apparatus generating accurate data regarding the heading of a land vehicle as it travels over terrain having changing conditions. The apparatus includes a first sensor means, such as a differential odometer, generating data regarding the relative direction of the vehicle. Also included is a second sensor means, such as a flux gate compass, for generating data regarding the absolute direction of the vehicle relative to the earth. The relative directional data and the absolute directional data are combined in a means for generating accurate data regarding the heading of the vehicle. A means for reducing errors reflected in signals generated by the sensors is provided to insure the accuracy of the output.

29 Claims, 24 Drawing Figures

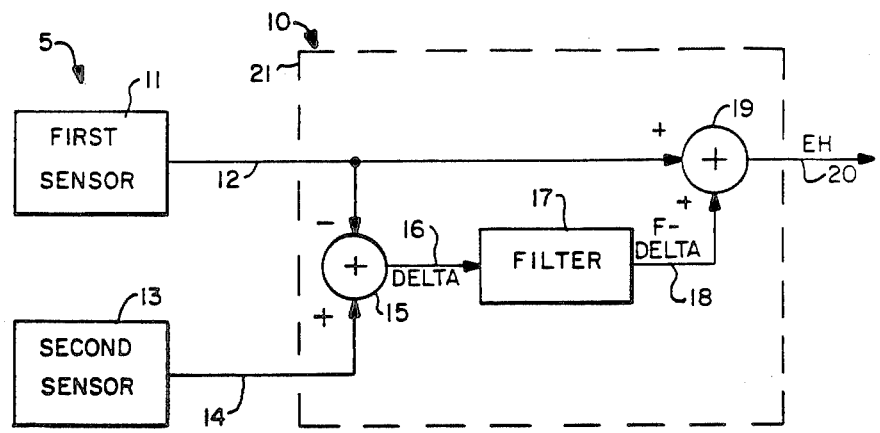
FIG. —1
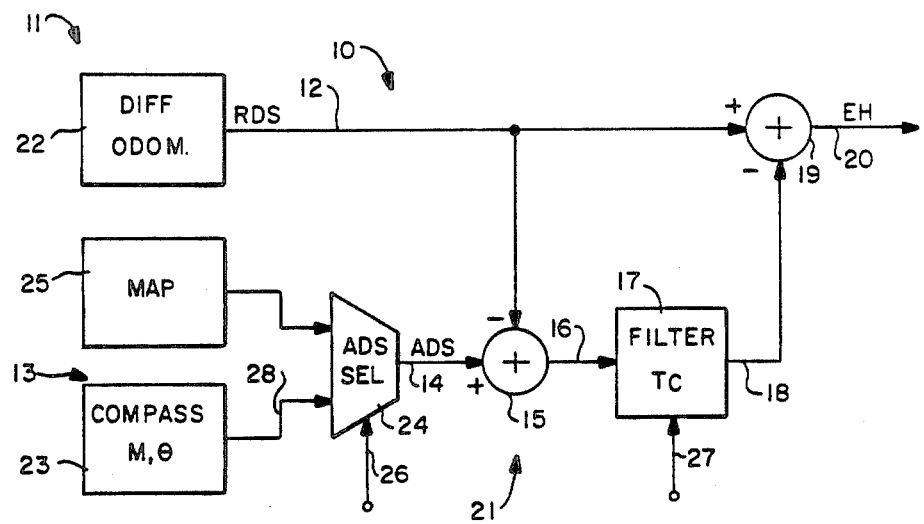
FIG. —2

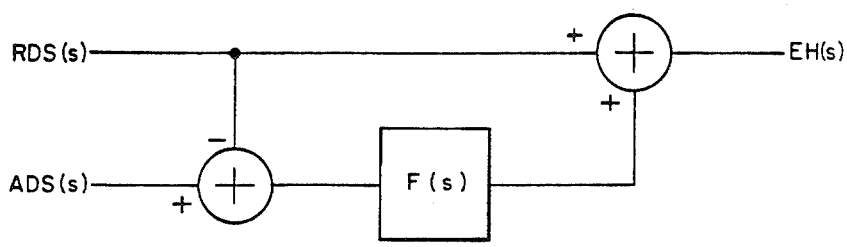
FIG.—1A
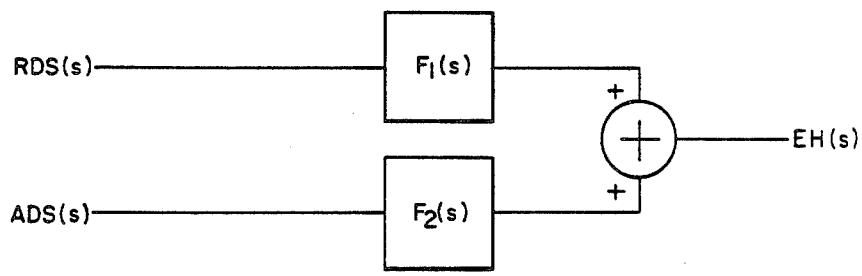
FIG.—1B
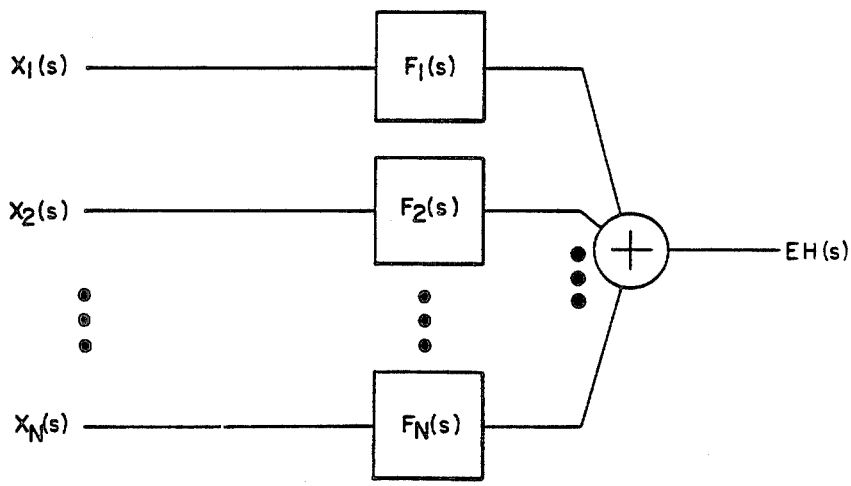
FIG.—1C

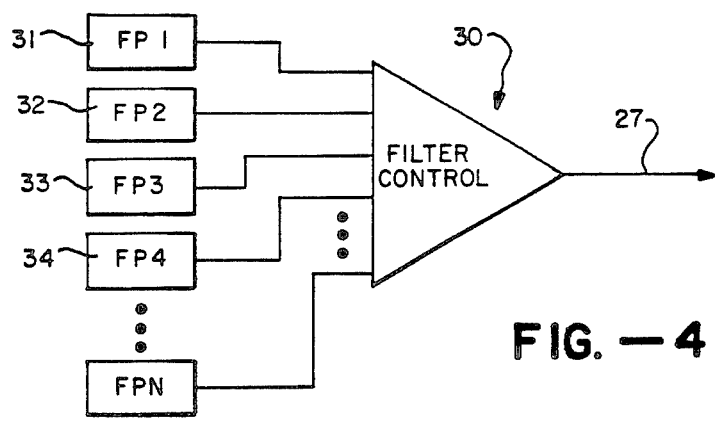
FIG. —4
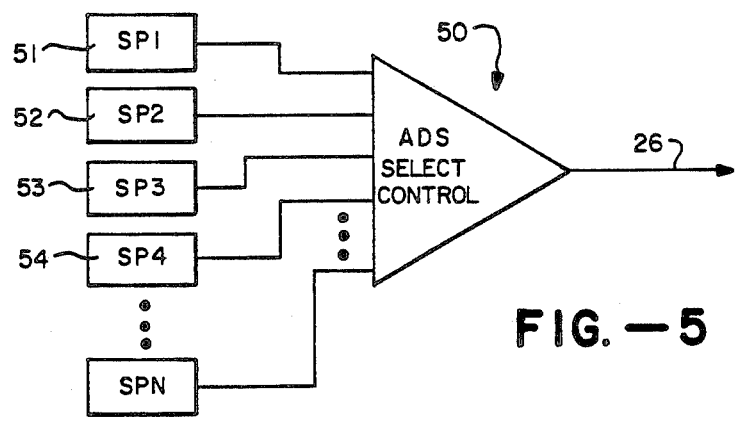
FIG. —5
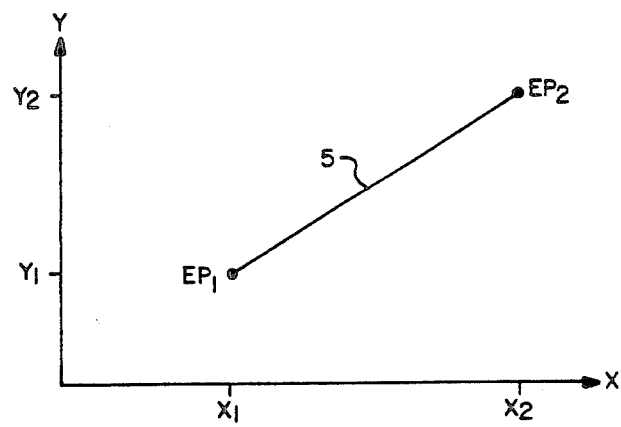
FIG. —6

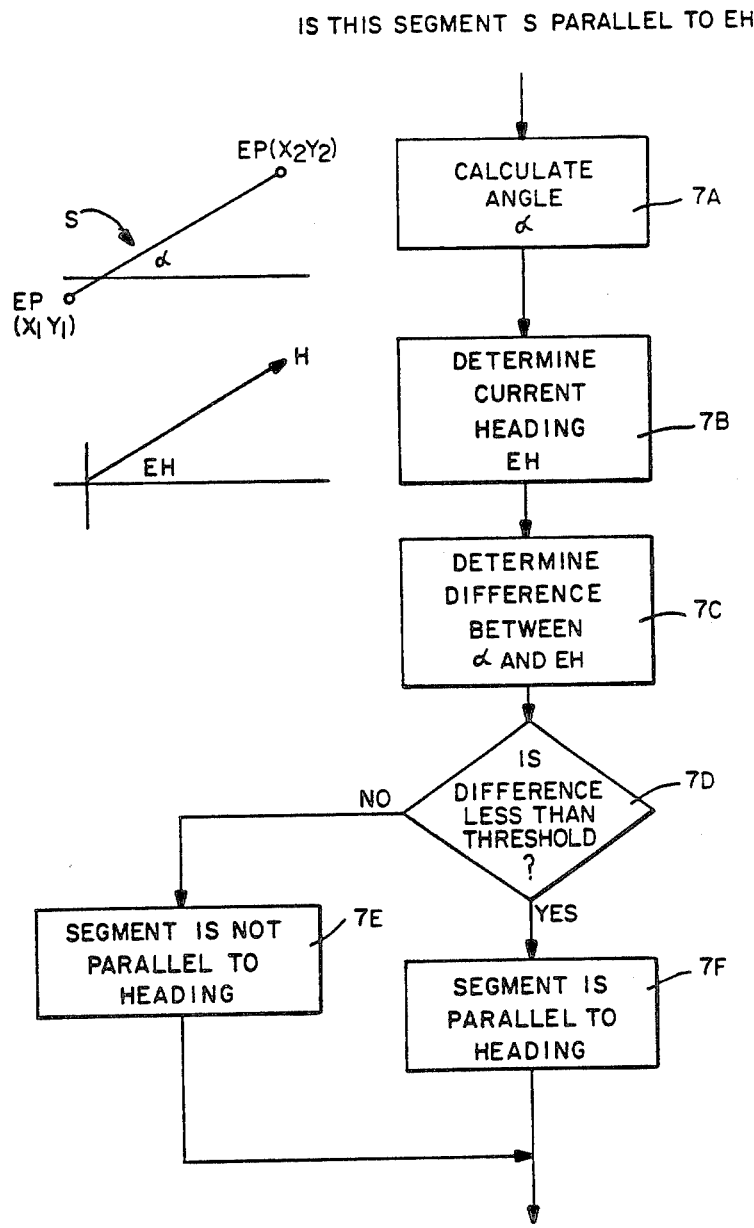
FIG. — 7

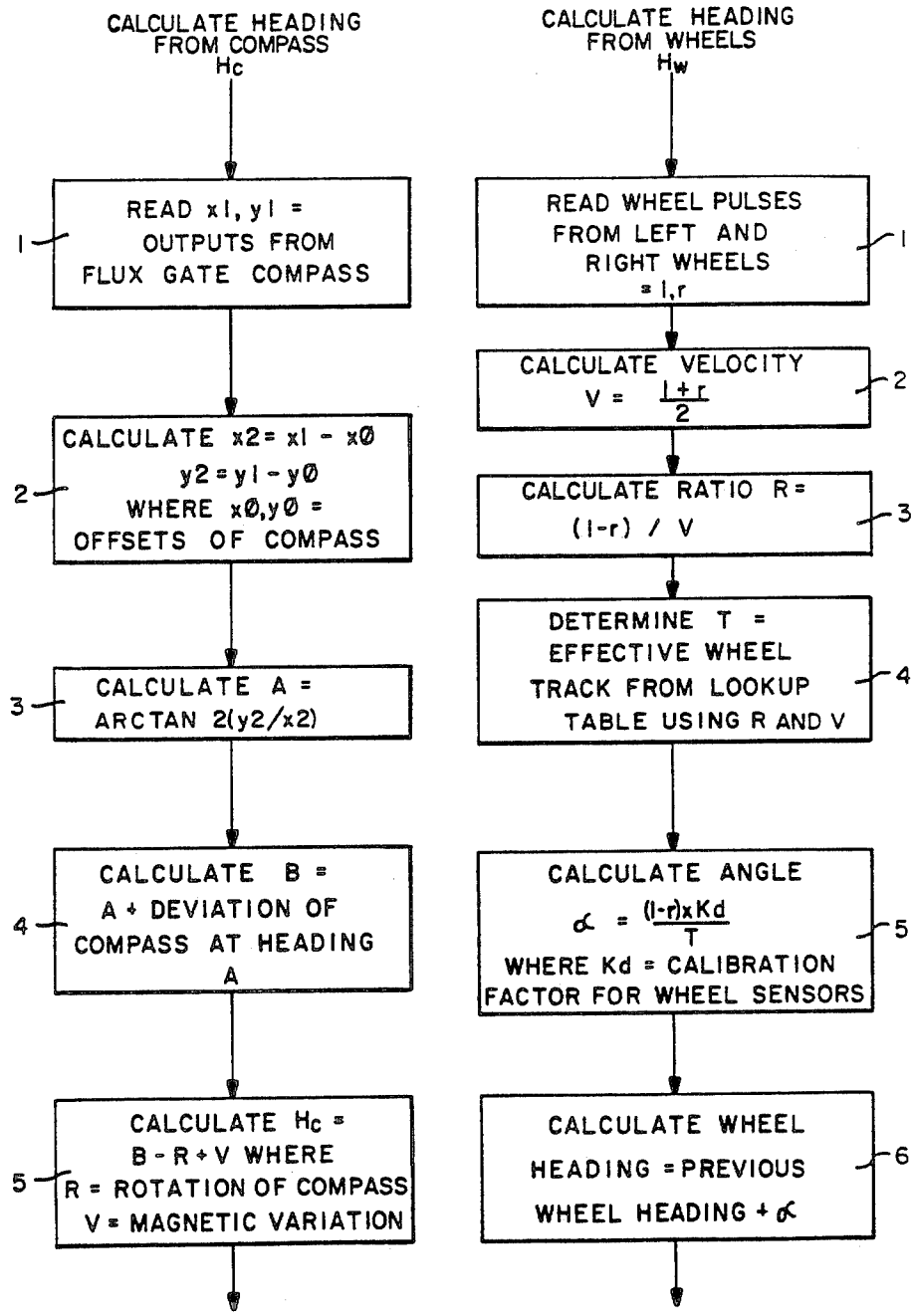
FIG.—8A    FIG.—8B

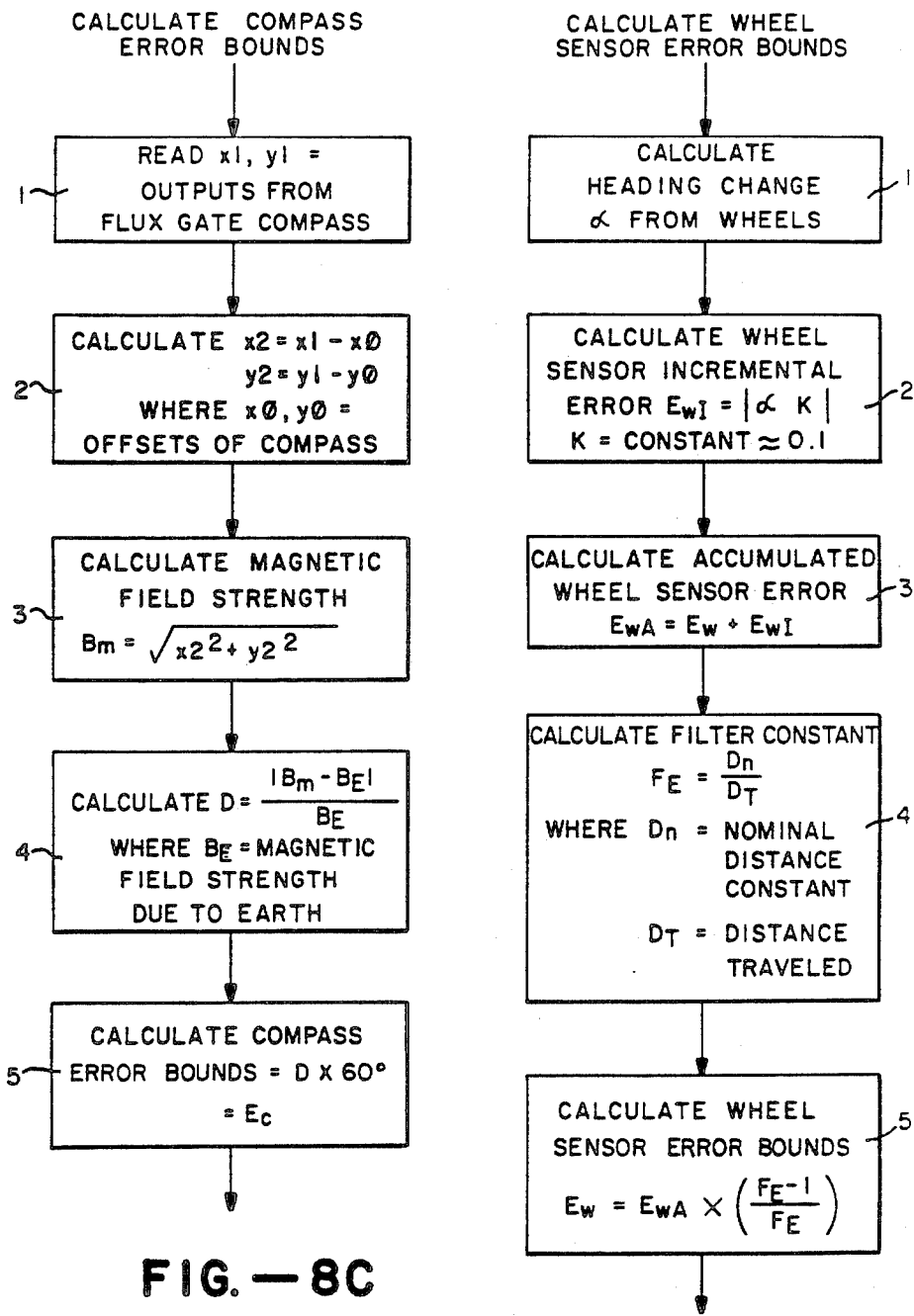
FIG.—8C
FIG.—8D

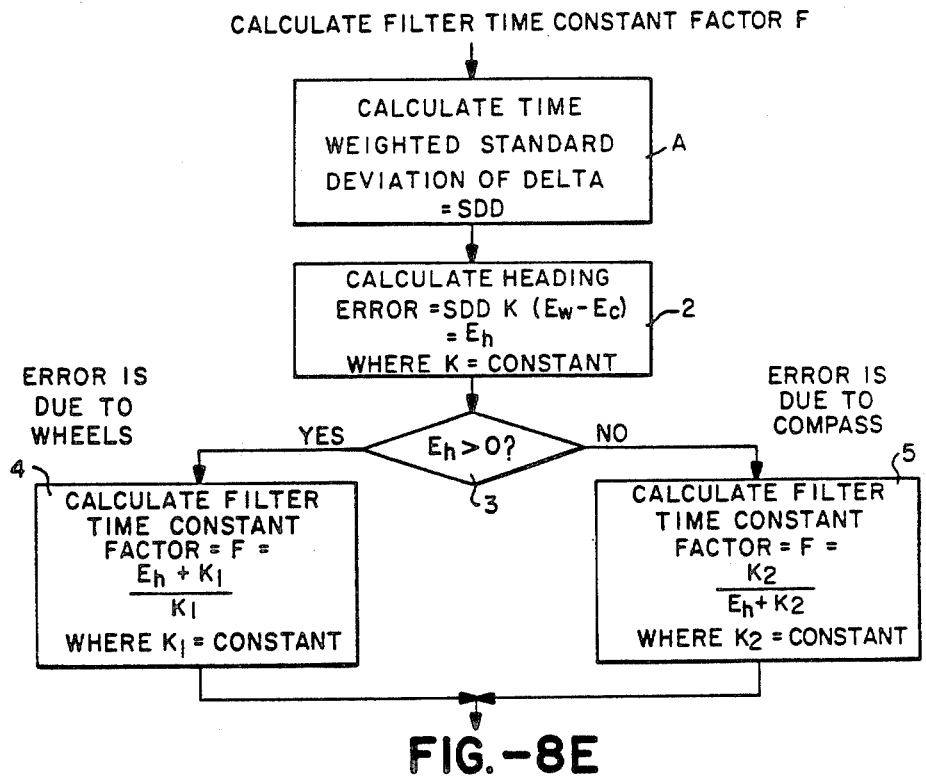
FIG.-8E
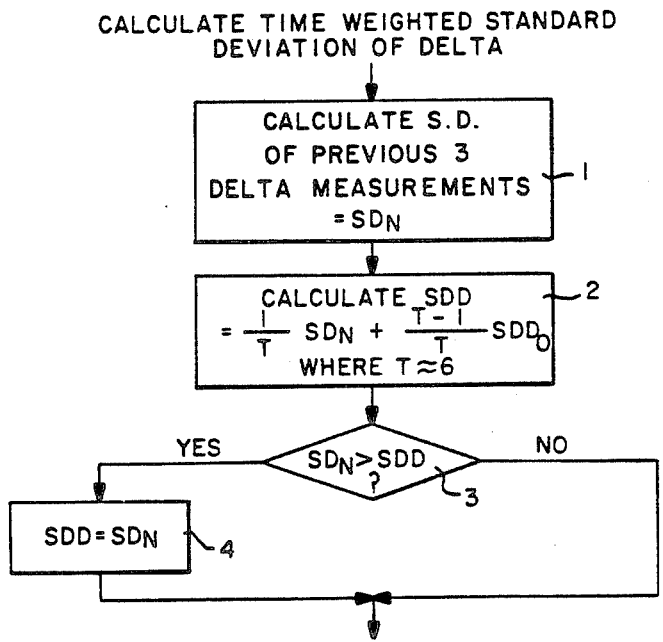
FIG.-8E/A

APPARATUS FOR GENERATING A HEADING SIGNAL FOR A LAND VEHICLE

CROSS-REFERENCES TO RELATED APPLICATIONS

The present application is related to the following U.S. Patent applications which were owned at the time of invention and are currently owned by the same assignee, and are incorporated by reference as is fully set forth in this application.

FLUX GATE SENSOR WITH IMPROVED SENSE WINDING GATING, inventor Alan C. Phillips, Ser. No. 675,827, filed Nov. 28, 1984, U.S. Pat. No. 4,646,015, issued Feb. 24, 1987.

VEHICLE NAVIGATION SYSTEM AND METHOD, inventors Stanley K. Honey et al, Ser. No. 618,041, filed June 7, 1984.

FIELD OF THE INVENTION

The present invention relates generally to an apparatus for providing accurate information regarding the heading of a land vehicle.

The appendix provided with the disclosure of this patent document contains material to which a claim of copyright protection is made. The copyright owner has no objection to the facsimile reproduction by anyone, of the patent document, the patent disclosure or the appendix as it appears in the Patent and Trademark Office patent file or records, but reserves all other rights whatsoever.

BACKGROUND OF THE INVENTION

A variety of automatic vehicle navigation systems has been developed and used to provide information about the actual location of the vehicle as it moves over streets. For example, one general approach to such vehicle navigation systems is known as "dead reckoning", in which the vehicle is tracked by advancing a dead reckoned position from measured distances traveled and headings of the vehicle.

Central to all of the dead reckoning navigation systems for vehicles is the need to generate data regarding the heading of the vehicle as it travels through constantly changing conditions. Any error in the heading information generated by the system translates directly into an error in the positioning of the vehicle for dead reckoning type systems.

Some prior art systems employ an absolute heading sensor, such as a magnetic compass or gyrocompass, to generate data regarding the heading of the vehicle. Gyrocompasses are expensive, and inappropriate for use in vehicles, such as automobiles or other land vehicles, that rapidly maneuver. Magnetic compasses also do not work ideally for land vehicles because for instance, the streets may be surrounded with large steel structures which cause anomalies in the magnetic field of the earth around the structures which will in turn deflect a magnetic compass reading as the vehicle drives past. Further, the roads may be banked, inclined, or crowned and thereby cause other errors, such as magnetic dip error, which are reflected in the signals generated by the sensor. If the magnetic compass is gymballed, accelerations of the vehicle affect the alignment of the compass and thereby create apparent magnetic dip error.

Another type of direction sensor measures relative heading. Examples include directional gyro compass, gas turning-rate sensor, laser ring gyro compass, vibrating rod turning-rate sensor, and differential odometer. This sort of sensor measures turning rate from which the relative heading of the vehicle is calculated at a given time given the heading at a prior time. Relative heading sensors are likewise subject to a variety of errors caused by temperature, component drifts, and component offsets. Differential odometers are subject to errors due to characteristics of the streets, the wheels of the vehicle or the vehicle itself, such as crowning of the roads, bumpy roads, uneven ride of the wheel over the streets, misalignment of the wheels, and so on. For these and other reasons, the accuracy of this sort of sensor is difficult to maintain.

For any given type of heading sensor, the sources of errors in the signal generated are for a large part external to the sensor itself, so calibration of the sensor cannot compensate for some sources of heading inaccuracy in land vehicles. Because all heading sensors are subject to errors caused by some combination of the conditions of the vehicle, of the sensor and of the streets or terrain over which the vehicle travels, prior art navigation systems have been unable to generate accurate data regarding the heading of a land vehicle.

Accordingly, there is a need for an apparatus for generating accurate data regarding the heading of a land vehicle as it travels through constantly changing conditions, such as when the land vehicle travels over varied surfaces and through varying environments.

SUMMARY OF THE INVENTION

The present invention provides an apparatus for generating accurate data regarding the heading of a land vehicle. The apparatus provides a plurality of sensor means for generating a plurality of independent direction signals including heading information indicating a heading of the land vehicle. The invention provides a processor means, responsive to the plurality of independent direction signals, for generating an improved estimate of the heading of the vehicle.

The plurality of independent direction signals respectively include errors having essentially independent spectral characteristics. In other words, the errors suffered by each of the plurality of sensor means are reflected in the independent direction signals with frequency characteristics that are different from the frequency characteristics suffered by others of the independent direction signals. Thus in a preferred embodiment, the processor means includes a means for selectively filtering at least one of the plurality of independent direction signals according to the spectral characteristics of the errors included in said at least one direction signal. Thereby the heading information from the least one direction signal is recovered essentially error free.

In one embodiment, the plurality of independent direction signals include at least a first direction signal including errors having primarily first spectral characteristics and a second direction signal including errors having primarily second spectral characteristics that are different from the first spectral characteristics. In this embodiment, the processing means includes a first means for combining the first direction signal and the second direction signal to generate a combined error signal isolating the first and second errors from the heading information. The combined error signal is supplied to a means for filtering the combined error signal according to the first spectral characteristics to generate a filtered error signal which includes essentially the second errors only. Last, the filtered error signal and the second direction signal are supplied to a second means for combining in which the second errors are offset by the filtered error signal, thereby providing an improved estimate of the heading information.

In another aspect, the present invention provides an apparatus for generating data regarding the heading of the land vehicle operable with a vehicle navigation system. The vehicle navigation system includes a storage means for storing a map data base which includes data regarding the heading of streets within the map. The vehicle navigation system provides a means for recognizing that the vehicle is on a particular street and for generating a signal regarding the heading of a vehicle recognized to be on the particular street. Provided in this aspect of the invention is a means, responsive to a control signal, for selecting between the heading data supplied from the map data base and the heading data generated by one of the heading sensors.

In sum, the present invention, provides more than one independent source of heading data, each source suffering errors that are different in their frequency characteristics from the other sources. The apparatus effectively filters most errors by combining, filtering and recombining direction signals from the independent sources, thereby forming a heading estimate which is on average better than the heading estimate of any one source.

BRIEF DESCRIPTION OF THE DRAWINGS

FIG. 1 is a system overview block diagram of the present invention.

FIGS. 1A–1C illustrate various embodiments of the present invention.

FIG. 2 is a block diagram of a preferred embodiment of the present invention.

FIG. 4 is a block diagram of a filter control means used in conjunction with the apparatus shown in FIG. 2.

FIG. 5 is a block diagram of a selector control means used in conjunction with the apparatus of FIG. 2.

FIG. 6 is a chart used for illustrating the map data base.

FIG. 7 is a flowchart showing a subroutine for determining whether the vehicle is traveling parallel to a particular street in the map data base.

FIGS. 8 and 8A–8H are flowcharts illustrating a method according to the present invention.

DETAILED DESCRIPTION

Figure 3A:
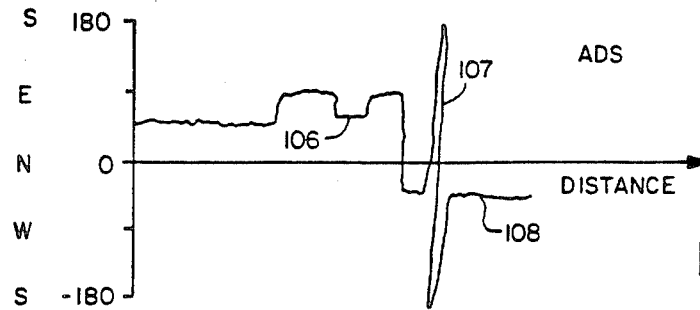
FIGS. 3A–3E are graphs of signals used in describing the apparatus of FIG. 1.

With reference to the figures, a system overview of the present invention is provided, followed by a discussion of the basic theory of operation and a description of a preferred embodiment.

I. Overview

The components of an apparatus 10 according to the present invention can be seen in the system overview shown in FIG. 1. The apparatus 10 of the present invention includes a plurality 5 of sensor means including at least a first sensor means 11 for generating a first direction signal including heading information on line 12 and a second sensor means 13 generating a second direction signal including heading information on line 14 that is independent of the first direction signal. The first and second direction signals include first and second errors in addition to the heading information. The first errors have first spectral characteristics. The second errors in the second direction signal have second spectral characteristics which are different from the first spectral characteristics.

The second direction signal on line 14 and the first direction signal on line 12 are connected to a first combining means 15 for combining the first direction signal and the second direction signal to generate a combined error signal on line 16. The combined error signal is the difference between the first direction signal and the second direction signal so that the heading information is cancelled from the combined error signal. The combined error signal from the first combining means 15, termed DELTA, is provided over line 16 to a filter means 17 for filtering the DELTA signal according to the second spectral characteristics. The output of the filter means 17 is a filtered error signal F-DELTA on line 18 from which the second errors have been essentially filtered out, leaving the first errors. The first direction signal on line 12 and F-DELTA on line 18 provided as inputs to a second combining means 19. The second combining means 19 combines the F-DELTA signal and the first direction signal essentially offsetting the first errors to generate an improved estimated heading EH on line 20 estimating the heading of the land vehicle on which the apparatus 10 is mounted.

In sum, the apparatus 10 shown in FIG. 1 includes at least a first sensor means 11, a second sensor means 13 and a processor means 21, responsive to the first direction signal generated by the first sensor means 11 and the second direction signal generated by the second sensor means 13, for generating data on line 20 regarding an estimated heading EH of the vehicle.

II. Theory of Operation

The present invention is described in terms of the "spectral characteristics" of the errors in the direction signal. The spectral characteristics of the errors in a particular direction signal are determined in part by the type of direction sensor which generates the signal. In a preferred embodiment of the present invention as described below, the first sensor means is implemented with a relative direction sensor such as a differential odometer, which generates a relative direction signal RDS, while the second sensor means is implemented with an absolute direction sensor, such as a compass, which generates an absolute direction signal ADS. As mentioned earlier, an absolute direction sensor such as a magnetic compass is subject to magnetic anomalies, which create short term errors. More precisely, these anomalies create errors in the ADS for distances relatively close to the location of the anomaly. Thus, as the vehicle passes by the anomaly, the effect is seen for only a small distance. Because distance and time are directly related (Velocity×Time=Distance) it is useful to interchange time for distance and use the more familiar time/frequency analogy in discussing the present invention. Thus, the errors in the ADS are confined to the relatively high end of the heading signal spectrum, that is they have relatively high frequency components.

In contrast the primary errors of the RDS are relatively long term (i.e., long distance) and thus are confined to the relatively low end of the heading signal spectrum, that is they have relatively low frequency components.

Lastly, we can think of the actual heading information itself as having, at one time or another, spectral characteristics having all frequency components in the heading signal spectrum. For example, while turning a sharp corner the actual heading changes rapidly over a relatively short distance and time giving high frequency components. When driving down a long straight road the actual heading changes only slightly, giving rise to very low frequency components. In general, the frequency components of the heading will vary over a wide spectrum, depending upon the velocity and route.

Because the actual heading varies over a wide spectrum, simple frequency filtering of either the ADS signal or the RDS signal is not adequate because it will, at times, filter the actual heading signal as well as the error signal.

The preferred embodiment of the present invention first subtracts one direction signal from the other, thereby eliminating the actual heading information and generating the combined error signal DELTA including the errors from both signals. Because the errors from the two sensors are independent, on average, nothing else is cancelled and the remaining signal DELTA represents all errors. We can now pass this combined error signal DELTA through a frequency selective filter which is tuned to eliminate the high frequency error components, that is errors having the spectral characteristics of the error in the ADS. This has the effect of eliminating the high frequency errors of the ADS. Ideally, the signal F-DELTA remaining after filtering (line 18, FIG. 1) contains only the lower frequency errors of the RDS essentially unaltered. This signal is recombined with the RDS signal to cancel these lower frequency errors, ideally leaving only the actual heading information as a more accurate heading estimate EH at the output.

The present invention is further improved as described below by estimating the relative size of the errors in the ADS and RDS. At different times one or the other sensors may indicate a higher relative level of error. When this happens, the filter is adjusted to eliminate more of the errors from the sensor generating the higher level of error.

In general, the estimated heading EH is not precisely equal to the vehicles' actual heading because the combining and filtering processes are not ideal and the spectral properties of both sensors are not totally separated. However, the present invention provides a substantially better estimated heading EH, over more driving conditions and environments, than can be obtained from either heading sensor individually.

The present invention can be further illustrated in terms of a simplified mathematical model. The first sensor means 11 generates, for example, a relative direction signal RDS which indicates the heading of the vehicle relative to a prior heading of the vehicle. Since the first sensor means 11 generates a relative direction signal RDS, a random start heading of the vehicle will be reflected in the output from the first sensor means 11 by an offset from the heading of the vehicle relative to the earth by a random value. Also, tire slip and imprecise calibration will cause additional errors. These errors are accumulated in the RDS signal, that is, every error reflected in a prior output of sensor means 11 is contained in the current output of the first sensor means 11 for the present heading. Thus, a simplified, representation of the relative direction signal (RDS) is given by the following equation:

$$RDS = H + R + D, \quad (1)$$

where H is equal to the heading information, R is equal to the random start heading and D is equal to errors accumulated due to drift or other errors in the signal generated by the first sensor.

A second sensor means 13 generates, for example, an absolute direction signal ADS which indicates the heading of the vehicle relative to the earth. In the preferred embodiment, the second sensor means 13 detects the direction of the magnetic field of the earth and calculates the heading of the vehicle relative to the direction of the magnetic field of the earth. The difference between magnetic heading and true heading, called variation, can be easily corrected by a lookup table or otherwise and has not been included here to simplify the discussion. A major source of error in the output of the second sensor means 13 resides in magnetic anomalies, such as changes in the magnetic field of the earth caused by changing conditions surrounding the second sensor means 13 as the vehicle travels across varying terrain or streets. Thus, the output of the second sensor means 13, the absolute direction signal (ADS) can be represented in simplified form as follows:

$$ADS = H + A, \quad (2)$$

where, H is equal to the heading information of the vehicle and A is equal to errors due to magnetic anomalies and other errors.

The means 21 for combining the relative direction signal RDS and the absolute direction signal ADS reduces the effects of errors A in the absolute direction signal ADS and errors D and R in the relative direction signal RDS thereby generating an improved estimate of the heading of the vehicle EH on line 20.

Thus the first combining means 15 subtracts the relative direction signal RDS from the absolute direction signal ADS to generate the combined error signal, DELTA:

$$DELTA = ADS - RDS = (H+A) - (H+D+R) = A - (D+R) \quad (3)$$

In this signal, the heading information H of the vehicle is cancelled out. All that remains are anomalies A, random start heading error R and drift error D. In the absence of A, this DELTA signal would typically only be slowly varying, having low frequency characteristics because R is constant, and D changes slowly. Anomalies A, however, generally vary quickly with time, that is, with distance as the vehicle moves. These anomalies A, can then be filtered from the signal by a low pass filter which passes only constant value or slowly varying signals. Since H can also vary quickly, the key in this embodiment is to first subtract out H (Eq. 3) to isolate the errors, then filter the resulting signal DELTA to eliminate A, then use the resulting filtered error signal F-DELTA to cancel low frequency errors from the RDS signal to improve the heading estimate. The filter means 17 filters the errors A from DELTA to generate F-DELTA. Thus, F-DELTA is equal to:

$$F\text{-}DELTA = -(R+D) \quad (4)$$

The second combining means 19 then adds RDS and F-DELTA to generate the improved estimate regarding the heading:

$$EH = RDS + F\text{-}DELTA = H + R + D - (R+D) = H \quad (5)$$

As the simplified mathematical model just described illustrates, the output on line 20 of the apparatus 10 is a signal that estimates the heading of the vehicle.

It should be mentioned that the above illustration is only an approximation of the actual process and hence the output is not exact. Errors such as measurement noise, imperfect filtering and overlap in the spectrum of A and the other error signals R, D, cause the estimate to be non-exact.

The embodiment of the present invention shown in FIG. 1 can be extended to a plurality of sensors as described with the aid of FIGS. 1A, 1B and 1C. FIG. 1A shows the apparatus 10 of FIG. 1 redrawn according to standard linear systems notation (see, for example, *Digital Signal Processing* by A. Oppenheim and R. Schafer). Thus in FIG. 1A, each signal and filter is described as a function of frequency (s). Thus ADS(s) represents the absolute direction signal, RDS(ss) represents the relative direction signal, and F(s) represents the filter. Accordingly, the system equation for FIG. 1A can be written as equation (6) as follows:

$$EH(s) = RDS(s) + (ADS(s) - RDS(s)) F(s); \quad (6)$$

where EH(s) represents the estimated heading as a function of frequency.

Equation (6) can be rewritten as equation (7) as follows:

$$EH(s) = RDS(s) (1 - F(s)) + ADS(s) F(s). \quad (7)$$

Equation (7) can be represented as equation (8) as follows:

$$EH(s) = RDS(s) F_1(s) + ADS(s) F_2(s); \quad (8)$$

where
$F_1(s) + F_2(s) = 1$ for all s.

Thus FIG. 1A can be redrawn as shown in FIG. 1B. In this manner $F_1(s)$ is equal to a filter equation adapted to filter the errors having spectral characteristics that are likely to occur in the relative direction signal. Likewise, $F_2(s)$ corresponds to the filter equation defining filter characteristics corresponding to spectral characteristics of errors likely to occur in the absolute direction signal. Thus according to the embodiment shown in FIG. 1B, each direction signal is separately filtered and the filtered outputs are combined to obtain the estimated heading EH(s), with the constraint on the filters that $F_1$ and $F_2$ when added equal 1 for the entire range of frequency (s) that is relevant to the heading calculation.

Further expanding from the embodiment of FIG. 1B and equation (8), FIG. 1C shows an embodiment of the invention using a plurality of sensors to generate a plurality of direction signals $X_1(s), X_2(s), \ldots X_N(s)$, and a plurality of filters having filter characteristics defined by equations $F_1(s), F_2(s), \ldots F_N(s)$. The estimated heading EH(s) is generated by the combination of the output of each of the plurality of filters as shown in equation (9) as follows:

$$EH(s) = X_1(s)F_1(s) + X_2(s)F_2(s) + X_N(s)F_N(s); \quad (9)$$

where $F_1(s) + F_2(s) + \ldots F_N(s) = 1$ for all s.

In the preferred embodiment, where $X_i(s)$ represents the signal from the $i^{th}$ sensor, $F_i(s)$ represents the filter equation defining the filter characteristics adapted to filter errors having the spectral characteristics likely to occur in the signal $X_i(s)$ from the $i^{th}$ sensor. Thus each sensor is filtered according to the spectral characteristics of the errors likely to occur in the direction signal generated by the sensor, within the overall filter constraint that the sum of the filter equations for all relevant frequencies is equal to one.

III. A Preferred Embodiment

FIG. 2 shows a block diagram of a preferred embodiment of the invention as implemented on a vehicle for traveling over land and used in conjunction with a vehicle navigation system. The reference numbers used in FIG. 1 are used in FIG. 2 where appropriate or consistency.

Figure 3B:
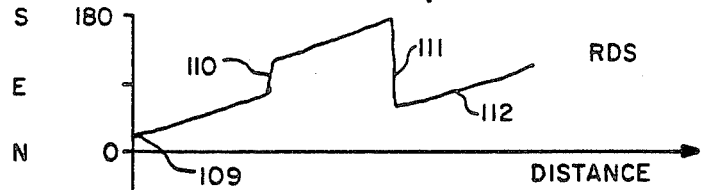
Figure 3C:
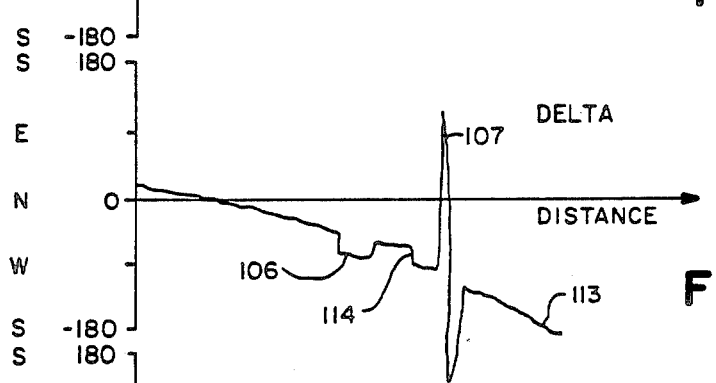
Figure 3D:
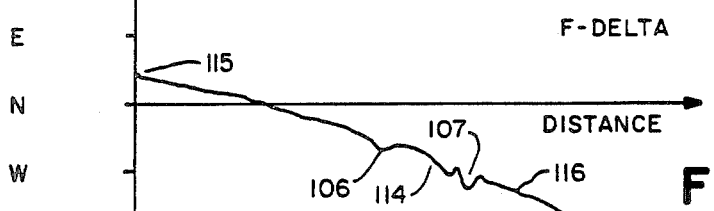
Figure 3E:
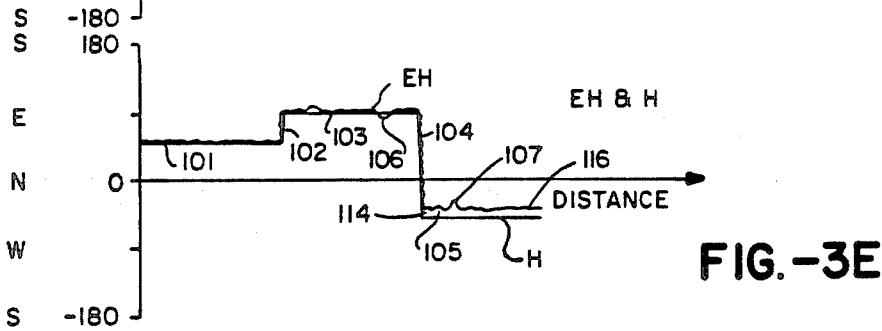

FIGS. 3A through 3E are used to illustrate the operation of the apparatus 10 of FIG. 2 by way of example. FIG. 3A shows a sample of the absolute direction signal ADS generated, for instance, by magnetic flux gate compass mounted on the vehicle. FIG. 3B illustrates a relative direction signal RDS generated for instance by a differential odometer on the vehicle. FIG. 3C illustrates the DELTA signal generated at the output of the first combining means 15. FIG. 3D illustrates the F-DELTA signal generated at the output of the filter means 17. FIG. 3E illustrates the resulting estimated heading EH of the vehicle across the course for the example superimposed on the actual course H for the example.

The apparatus 10 as shown in FIG. 2 includes the first sensor means 11, the second sensor means 13, and the processor means 21 including the first combining means 15, the filter means 17, and the second combining means 19.

The first sensor means 11 is implemented using a differential odometer 22. The differential odometer 22 is a means for generating a relative direction signal RDS on line 12 by comparing the difference in distance traveled by wheels on the opposite sides of an axle of the vehicle as mentioned above.

The second sensor means 13 is implemented with a compass means 23 for generating an absolute direction signal ADS, such as a magnetic flux gate compass described in prior U.S. patent application Ser. No. 675,827 entitled "FLUX GATE SENSOR" invented by Alan C. Phillips and owned by an assignee in common with the present application. The compass means 23 generates a signal on line 28 indicating the heading of the vehicle relative to the magnetic field of the earth. The output of the compass means 23 includes a magnitude component M indicating the magnitude of the magnetic field surrounding the compass means 23 and a directional component $\theta$ indicating the angle of the heading of the vehicle relative to the magnetic field.

The actual compass outputs X and Y are given by equations 10 and 11:

$$X = M \cos L \cos \theta, \quad (10)$$

$$Y = M \cos L \sin \theta, \quad (11)$$

where,
M = earth's magnetic field magnitude,
L = angle above horizontal of earth's field, or "magnetic dip",
$\theta$ = horizontal angle of earth's field, or "direction".

Thus the direction component $\theta$ can be closely approximated by equation 12:

$$\theta = \arctan(Y/X) \quad (12)$$

The heading component $\theta$ of the output is fed into a selector means 24, responsive to an ADS control signal on line 26, for selecting one of two inputs as the absolute direction signal ADS for line 14. The second input of the selector means 24 is data stored in a map data base 25 of a vehicle navigation system described below. The data generated from a map data base 25 indicates the heading of the vehicle when the vehicle is known to be traveling on a particular street.

In normal operation and for the purposes of the description of the apparatus 10 as depicted in FIG. 2, it can be assumed that the selector means 24 selects the heading component $\theta$ from the compass means 23 as the absolute direction signal ADS for line 14. The generation of the ADS control signal on line 26 and the selection of the two inputs is described in more detail below with reference to FIG. 5.

As mentioned above, the operation of the apparatus 10 of FIG. 2 can be described with reference to the signal graphs of FIGS. 3A–3E. Beginning with FIG. 3E, line H shows the actual heading of the vehicle for the example. Thus, the vehicle in our example begins at a heading of about 45° north of east along the segment 101. Then as illustrated by segment 102, the vehicle makes a 45° turn toward the east. (For purposes of illustration, the turns are considered as instantaneous.) The vehicle then travels straight as illustrated in segment 103 until making an approximately 120° turn as illustrated in segment 104. The vehicle then proceeds straight at its resultant heading of about 30° west of north to the end of the example along segment 105.

FIG. 3A shows an example of the absolute direction signal ADS as the heading component $\theta$ magnetic flux gate compass 23. The signal generated by the magnetic flux gate compass 23 tracks the actual heading H. It can be seen that errors 106 may occur, due to anomalies such as magnetic dip error, that are reflected in the signal generated by the magnetic flux gate compass 23. Also as the chart of FIG. 3A shows magnetic anomalies due to steel structures or the like can cause the flux gate compass to generate a spike 107 wherein the signal indicates a large deviation, shown as an approximately 360° turn in the ADS.

FIG. 3B shows a simplified example of the RDS generated by the differential odometer 22. The starting heading 109 is a random value as discussed above and is not likely to be the vehicle heading. The signal illustrates sensor drift, reflected in the slope of the relative direction signal. The turns taken by the vehicle are well delineated at segments 110 and 111. However, due to an error caused by, for example, wheel slip, the turn, 111, as indicated by the relative direction signal RDS appears to be slightly less than the full 120° shown in segment 104. Also, it can be seen in FIG. 3B that the slope in the final segment 112 is slightly greater than the slope of the earlier segments of the figure, illustrating that the drift error may not accumulate at a constant rate in the relative direction signal.

FIG. 3C shows the DELTA signal generated by subtracting the absolute direction signal of FIG. 3A from the relative direction signal of FIG. 3B. The magnetic anomalies, 106 and 107, are clearly reflected in the DELTA signal. Also, the drift, wheel slip and random start heading are reflected in the DELTA signal. It can be seen at the final segment, 113, shows the increased slope of the drift illustrated by segment 112 in FIG. 3B. Also a slight offset 114 due to wheel slip can be seen in the DELTA signal. By subtracting RDS from ADS we have cancelled the sometimes rapidly varying heading information.

As discussed above, the higher frequency anomalies from the DELTA signal on line 16 can now be filtered by filter means 17 without affecting the heading information H to generate an F-DELTA signal as illustrated in FIG. 3D. The F-DELTA signal from line 18 shown in FIG. 3D is similar to the DELTA signal of FIG. 3C with a few exceptions. Most noticeable is the reduction of the spike 107. Less noticeable is the slighter reductions of the magnetic dip error anomaly 106 and the wheel slip 114. The slope of the drift is preserved although a slight slope-dependent shift is introduced by the filter from points 115 to 116.

The F-DELTA signal is then added to the relative direction signal by the second combining means 19, and the output is the estimated heading EH, plus magnetic variation, as illustrated in FIG. 3E superimposed on the actual heading H. The estimated heading H is not subject to the majority of the anomalies which are reflected in the absolute direction signal and the relative direction signal.

The characterisics of the filter means 17 determine the relative characteristics of the apparatus 10 in eliminating errors in the ADS and RDS signals. Accordingly, the setting of the characteristics of the filter means 17 directly translates into the responsiveness of the apparatus 10 to generate accurate data regarding the estimated heading of the vehicle. In the preferred embodiment, the filter means 17 operates by periodically sampling the DELTA signal from line 16 of the first combining means 15 over periods of distance traveled and filtering the DELTA signal to generate F-DELTA according to the following filter equation (13):

$$\text{F-DELTA}_{new} = \text{F-DELTA}_{old} \times \frac{T_C - 1}{T_C} + \frac{\text{DELTA}_{new}}{T_C} ; \quad (13)$$

where F-DELTA$_{new}$ is equal to the new value of F-DELTA; F-DELTA$_{old}$ is equal to the previous value of F-DELTA; $T_C$ is equal to the filter time (i.e., distance) constant; and DELTA$_{new}$ is equal to the new sample of DELTA.

Thus the filter means 17 behaves according to the filter constant $T_C$. $T_C$ is set so that generally high frequency fluctuations due to errors from the ADS in the DELTA signal on line 16 will be filtered out while the constant and the generally low frequency fluctuations due to errors from the RDS pass through and are reflected in F-DELTA on line 18. Decreasing $T_C$ has the effect of increasing the frequencies passed and thus giving higher weight to the ADS. Increasing $T_C$ has the effect of reducing the frequencies passed and thus giving higher weight to the RDS. The filter means 17 can be implemented using analog or digital techniques and in a variety of other filtering relationships depending on the spectral characteristics of the errors reflected in direction signals from the first sensor means and second sensor means.

In the preferred embodiment, the filter means 17 responds to a filter control signal on line 27 to vary the characteristics of the filter means 17, such as by varying the filter constant $T_C$ in the filter equation (equation (13)) set out above. The control of the filter means 17 is discussed with reference to FIG. 4.

III.A. Filter Control

FIG. 4 illustrates a filter control means 30 for generating the filter control signal on line 27. The filter control means 30 is responsive to multiple parameters FP1, FP2, FP3, FP4, and so on through FPN. The filter parameters are generated from the relative direction signal, the absolute direction signal, comparisons between the absolute direction signal and the relative direction signal, the map data base, the measured magnitude of the magnetic field and comparisons between magnetic field strengths and other sources of data. The filter control signal on line 27 operates to vary the filter constant $T_C$ and thereby controls the weight given to the relative direction signal as compared to the absolute direction signal in generating the data on line 20 estimating the heading of the vehicle.

For a filter means 17 implemented according to equation (13) set out above, as the filter constant $T_C$ approaches one, the output on line 20 of the apparatus 10 follows the absolute direction signal on line 14 more closely. As the filter constant $T_C$ increases, the absolute direction signal on line 14 is given less weight, and the relative direction signal on line 12 is reflected more closely on line 20.

The first filter parameter FP1, which is input to the filter control means 30, is generated by subtracting the relative direction signal RDS on line 12 from the absolute direction signal ADS from the compass means 23 on line 28 (ADS−RDS). Then, a standard deviation SSD of (ADS−RDS) weighted as a function of distance is determined. If the distance weighted standard deviation SDD is large, then the differential odometer 22 and/or the compass means 23 are generating erroneous signals. When the compass means 23 and/or the differential odometer 22 are generating erroneous signals as indicated by the first filter parameter FP1, then the filter control means 30 determines, based upon the other filter parameters, whether to increase or decrease the filter constant $T_C$.

A means 31 for generating the first filter parameter FP1 is implemented in the preferred embodiment by software control of a computer (not shown). By way of example, the means 31 generates the first filter parameter FP1 by sampling (ADS−RDS) once every second for each second that the vehicle has travelled fifteen feet or more. The standard deviation SDD is calculated by taking the three most recent readings R1-R3 and calculating the current standard deviation $SD_N$ of these samples. If $SD_N$ is greater than or equal to SDD, then SDD is set equal to $SD_N$. If $SD_N$ is less than SDD, then SDD is allowed to decrease according to equation 14:

$$SDD_{new} = SDD_{old} \cdot \frac{T-1}{T} + \frac{SD_N}{T}, \quad (14)$$

where R=time constant for decay of SDD. In this manner, the standard deviation of (ADS−RDS) is weighted to reflect more strongly deviations in the data collected at the closest segment of distance travelled and responds quickly to sudden increase.

The second filter parameter FP2 is generated by means 32 for generating a signal indicating unusual deviations in the magnitude of the magnetic field of the earth as detected by the compass means 23. The second filter parameter FP2 is generated by comparing the measured magnitude of the magnetic field of the earth from the output of the compass means 23 against the expected magnitude of the magnetic field of the earth (corrected for any significant vertical dip angle L at the location of the vehicle). When the difference between the expected magnitude and the measured magnitude is large, then the output of the compass means can be expected to be unreliable. Thus, when the means 32 generates a filter parameter FP2 indicating that the measured magnitude of the magnetic field of the earth differs from the expected magnitude and filter parameter one FP1 is set, then the filter control means 31 signals the filter means 17 to decrease the filter constant $T_C$ and thereby reduce the effect of the absolute direction signal on the output and increase the dependence on the relative direction signal.

In the preferred embodiment, the means 32 is implemented by software control of a computer. The values for the expected magnitude of the magnetic field of the earth are stored in the computer during the calibration of the compass means 23. For example, the data may be generated by orienting the compass means 23 in a number of known headings and measuring the magnitude of the earth's field for each of those known headings. That measured magnitude for the known headings is stored in the computer. When the vehicle travels across terrain which causes anomalies in the magnetic field of the earth, then the difference between the expected magnitude of the magnetic field of the earth generated during calibration of the compass means 23 and the measured magnitude will indicate the presence of many of those anomalies.

The third filter parameter FP3 is generated in means 33 for indicating the accuracy of the compass means 23. For instance, the means 33 could be implemented using a map data base (discussed in more detail below) which sets a particular bit for areas on the map in which the output of the compass means 23 is expected to be subject to anomalies. The third filter parameter FP3 indicates that the filter constant $T_C$ should be decreased when FP1 is set.

The fourth filter parameter FP4 is generated by means 34 for indicating the accuracy of the differential odometer 22, or the first sensor means 11, generating the relative direction signal. For instance, the means 34 as implemented with a differential odometer 22 includes means for detecting the turn radius and the centrifugal force on the vehicle. These data regarding the turn radius and centrifugal force on the vehicle around the turn correlates with inaccuracies in the differential odometer 22 which depend on the suspension geometry of the vehicle and other factors specific to the particular embodiment of the differential odometer. The coefficients used in FP4 may be derived from both data entered regarding vehicle specifications and calibrations of the relative direction sensor on a specific vehicle by measurement.

Additional parameters, such as is indicated by the nth filter parameter FPN in FIG. 4, could be implemented depending on the particular embodiments of the direction sensors used.

In the preferred embodiment, the filter control means responds to the multiple parameters to generate a signal on line 27 which controls the filter constant $T_C$ for the filter means 17. This filter control is likewise implemented by software control of the computer.

Various interrelationships between the multiple parameters input to the filter control means 30 are determined by the particular embodiment chosen and implemented by programming the computer to recognize these interrelationships. Thus for a given plurality of sensor means, the filter means 17 is controllable to adapt to the spectral characteristics of errors reflected in the direction signals generated by those sensor means.

III.B. Vehicle Navigation System

As mentioned above, the apparatus 10 shown in FIG. 2 of the preferred embodiment is implemented on a land vehicle having a vehicle navigation system. The vehicle navigation system includes the map data base 25 having directional data regarding the heading of a vehicle known to be traveling on a particular street.

The preferred embodiment of the vehicle navigation system is disclosed in detail in the prior U.S. patent application entitled "VEHICLE NAVIGATION SYSTEM AND METHOD", invented by Stanley K. Honey, et al; Ser. No. 618,041; filing data 06/07/84, and owned by an assignee in common with the present application. The disclosure of the application Ser. No. 618,041 including the drawings, specification and claims is incorporated by reference as if fully set forth herein for the purpose of disclosing one preferred embodiment of the vehicle navigation system with which the apparatus 10 is used.

III.C. Map Data Base

For an apparatus 10 according to the present invention used in conjunction with a vehicle navigation system, the invention provides the selector means 24 as discussed above for selecting between the map data base heading data and the second sensor means heading data for the ADS signal. The map data base 25 is now discussed.

The vehicle navigation system provides the map storage means 25 (shown in FIG. 2) including a map data base as disclosed in application Ser. No. 618,041. This map data base includes data identifying (1) a set of line segments S defining the set of streets St, (2) street widths, (3) vertical slopes of the line segments S, (4) magnetic variation of the geographical area identified by the map, (5) map accuracy estimates, and (6) street names and street addresses.

FIG. 6 is used to explain the street segment data stored on map storage means 25 that identify a set of line segments S defining the set of streets St. Each such street St is stored on the storage means 25 as an algebraic representation of the street St. Generally, each street St is stored as one or more arc segments, or, more particularly, as one or more straight line segments S. As shown in FIG. 6, each line segment S has two end points $EP_1$ and $EP_2$ which are defined by coordinates $X_1Y_1$ and $X_2Y_2$, respectively, and it is these XY coordinate data that are stored in the storage means 25. The course or heading of the segment S can be determined from the end points.

The map data base also contains data to relate magnetic north to true north, magnetic dip angles to determine heading errors due to the vertical slope of streets St, and other data accounting for the actual magnetic variation of a given geographic area. Because these are generally continuous and slowly varying characteristics, only a few factors need be stored for the entire map data base for this purpose. As mentioned above, these factors may be input as one or more of the multiple parameters to the filter control means 30 and selector control means 50 described below.

The map data base is subject to a variety of other errors including survey errors and photographic errors which may occur when surveying and photographing a given geographic area to make the map data base, errors of outdated data such as a new street St that was paved subsequent to the making of the map data base, and, a general class of errors encountered when describing a 3-dimensional earth surface as a 2-dimensional flat surface. Consequently, the map data base may contain data estimating the accuracy for the entire map, for a subarea of the map or for specific line segments S. Additionally, some streets St in the map M are known to be generalizations of the actual locations (e.g. some trailer park roads). The map accuracy data may be coded in such a way as to identify these streets St.

The heading of a vehicle which is recognized as being on a particular line segment S is calculated from the map data base by determining the slope of the segment S from the endpoints $EP_1$ and $EP_2$ and comparing that slope to the known orientation of the map. For a two way street, the heading of the vehicle is determined to be the direction which is closest to the most recently generated estimated heading of the vehicle.

In summary, the map data base includes data identifying locations on the map having characteristics which are expected to cause the compass means to be unreliable, such as, streets with inclines causing magnetic dip errors, streets with large steel structures adjacent to them causing anomalies in the magnetic field surrounding the structure, data identifying geographic areas having natural variations in the magnetic field, and so on. This data identifying the characteristics of geographic locations is supplemented in the map data base by data indicating accuracy of the map itself.

III.D. Selector Control

FIG. 5 shows a block diagram of a selector control means 50 for generating the ADS signal signal on line 26. As mentioned above, the apparatus 10 of FIG. 2 operates normally to select the output of the compass means 23. However, when the ADS control signal indicates that the heading as calculated from the map data base is preferable, the selector means 24 will select the heading from the map data base as the absolute direction signal on line 14. The selector control means 50 for generating the ADS control signal on line 26 in the preferred embodiment is responsive to multiple selector parameters SP1 through SPN to generate the ADS control signal on line 26 causing the selector means 24 to appropriately select data from the map data base 25 or the compass means 23.

The first selector parameter SP1 indicates whether the navigation control system has identified the location of the vehicle as being on a particular street. Thus, the first selector parameter SP1 is generated by means 51 for indicating that the vehicle is located on a particular street.

The second selector parameter SP2 indicates whether the heading of the particular street is within a threshold of the data on line 20 regarding the estimated heading of the vehicle. Thus, the second selector parameter SP2 is generated by the means 51 for indicating whether the apparatus 10 is generating data that indicates an estimated heading of the vehicle which corresponds to the heading predicted by the particular street on the map data base 25.

The third selector parameter SP3 is derived from the map data base and indicates whether the vehicle is located in a geographic area or on a particular street segment which is expected to suffer magnetic anomalies causing errors in the output of the compass means 23. Thus, the means 53 for generating the third selector parameter SP3 generates data regarding expected errors in the compass signal due to the location of the vehicle.

In the preferred embodiment the selector control means 50 will cause the selector means 24 to select the map data base only when the first selector parameter SP1, the second selector parameter SP2, and the third selector parameter SP3 are set. Thus, the map data base would be used to generate the absolute direction signal on line 14 only when the navigation algorithm has decided that the vehicle is on a particular street, the map data base indicates that the compass means is expected to be subject to anomalies in the area in which the vehicle is located, and the output of the apparatus 10 indicating data regarding the estimated heading of the vehicle remains within a threshold angle of the heading indicated by the particular street on the map data base.

As illustrated in FIG. 5, additional selector parameters SPN may be implemented depending on the particular type of second sensor means 13 used for generating the absolute direction signal. Various interrelationships among the selector parameters are determined by the characteristics of the vehicle navigation system, the map data base, and the sensor used for generating the absolute direction signal.

In the preferred embodiment, each of the selector parameters SP1 through SPN and the selector control means 50 are implemented by software control of a computer, in conjunction with the navigation control system.

III.E. Navigation System Parameter

In another aspect of the present invention, when implemented with the vehicle navigation system as disclosed above, the output of the filter control means 30 as shown in FIG. 4 is a parameter fed back to the navigation system. The parameter on line 27 is used by the vehicle navigation system in its algorithm for determining whether the vehicle is located on a given street. Part of that algorithm compares the output of the apparatus 10, that is the data indicating the estimated heading of the vehicle on line 20, with the known heading of the segment S on which the vehicle has been located.

FIG. 7 shows the flow chart of the subroutine in the vehicle navigation system disclosed in prior application VEHICLE NAVIGATION SYSTEM AND METHOD, Ser. No. 618,041, for determining if a segment S is parallel to the estimated heading EH of the vehicle within a threshold. Initially, an angle $\alpha$ of the line segment S is calculated (block 7A) in accordance with equation 15:

$$\alpha = \arctan [(Y_2 - Y_1)/(X_2 - X_1)] \quad (15)$$

where $X_1$, $X_2$, $Y_1$, $Y_2$ are the XY coordinate data of the end points EP of the line segment S on which the vehicle is probably located and that currently being processed by the system.

Then, the current estimated heading EH of the vehicle is determined (block 7B) from line 20 of apparatus 10. Next, the system determines if the absolute value of $\alpha - EH$ or the absolute value of $\alpha - EH + 180°$ is less than a threshold number of degrees (block 7D). If this difference is greater than the threshold (block 7D), then the system determines that this line segment S is not parallel to the estimated heading EH of the vehicle (block 7E). If this difference is less than the threshold (block 7D), then the system determines that this segment S is parallel to the estimated heading EH of the vehicle (block 7F).

The means for determining whether this particular segment is parallel to the estimated heading of the vehicle receives the parameter on line 27 of FIG. 4 and generates a value for the threshold of block 7D. When the parameter indicates the estimated heading means 20 is unreliable then the threshold of block 7D is increased. On the other hand, the threshold of block 7D is decreased if the reliability of the estimated heading on line 20 is good as indicated by the parameter on line 27.

This parameter for setting the threshold of block 7D is one of several parameters used in the navigation system described in VEHICLE NAVIGATION SYSTEM AND METHOD application referred to above to determine the particular segment the vehicle is on, and hence determine the map heading data sometimes used as the ADS as described above.

III.F. Software Implementation

The apparatus 10 for generating an improved estimate regarding the heading of a land vehicle as disclosed above can be implemented using analog or digital components as known in the art. In the preferred embodiment the apparatus is accomplished by software control of a computer (not shown). FIGS. 8 and 8A through 8H provide flow charts of the software control of a computer operating according to the present invention.

Figure 8:
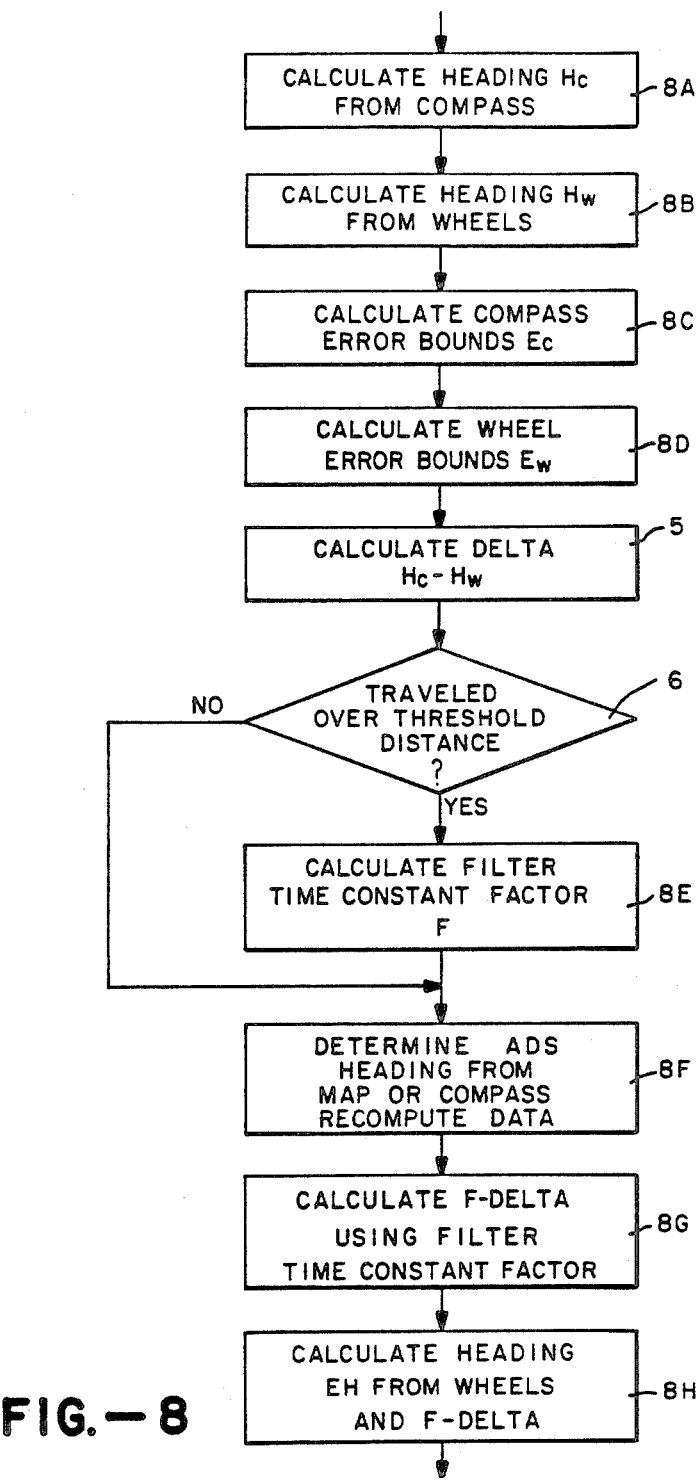

FIG. 8 is an over-all flowchart for the calculation of the estimated heading EH according to the present invention. The first step in the flow chart for the calculation of the estimated heading EH is to calculate the heading $H_C$ from the compass (block 8A). The heading $H_C$ from the compass corresponds to the directional component of the output of the compass. The calculation of the heading $H_C$ is set out in FIG. 8A.

The next step involves calculation of the heading $H_W$ from the wheels, that is the calculation of the direction signal from the differential odometer on the wheels (block 8B). The calculation of the heading $H_W$ from the wheels is shown in FIG. 8B.

The next step involves the calculation of the compass errors bounds $E_C$ (block 8C). Compass error bounds are calculated as shown in flowchart of FIG. 8C.

The next step involves the calculation of the wheel sensor error bounds $E_W$ (block 8D). The calculation of the wheel error bounds $E_W$ is shown in FIG. 8D.

The next step in the overall flowchart of FIG. 8 is to calculate the combined error signal DELTA from $H_C$ and $H_W$ (block 5). DELTA is equal to $H_C - H_W$.

In the next step the software determines whether the vehicle has traveled over a threshold distance (block 6). The threshold distance will be determined by the type of sensors used, the average velocity of the vehicle, and other factors to optimize the calculation of the estimated heading.

If the vehicle has traveled over the threshold distance, then a filter time constant factor is calculated (block 8E). The filter time constant factor is utilized in the calculation of the filter time constant $T_C$ discussed above. The calculation of the filter time constant factor F is shown in the flow chart FIG. 8E. If the vehicle has not traveled over the threshold distance then the time constant factor is left alone.

Figure 8F:
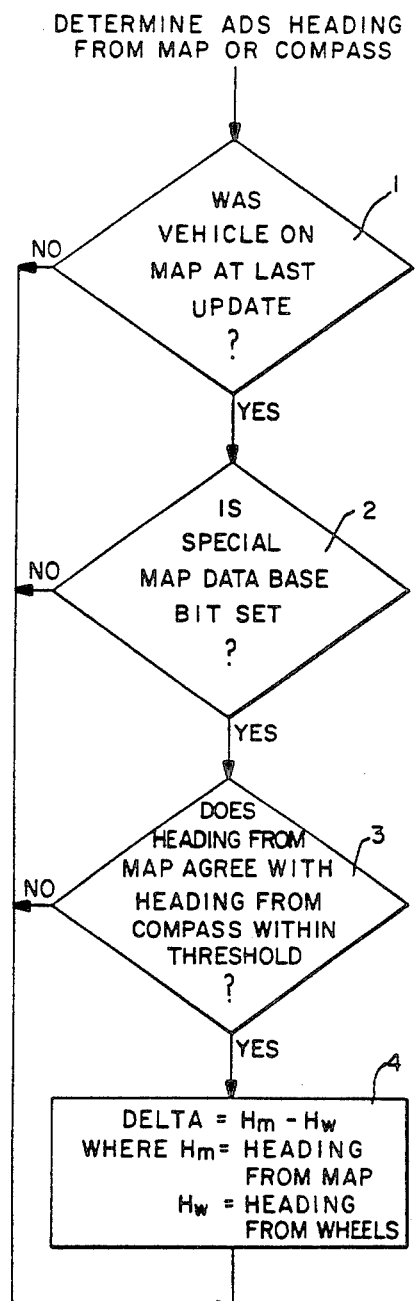

The next step involves determining whether to select the absolute direction signal from the heading $H_C$ or from the map data base. If the heading is selected from the map data base, then DELTA is recomputed (block 8F). FIG. 8F shows the algorithm for selecting the map base or the heading $H_C$.

Figure 8G:
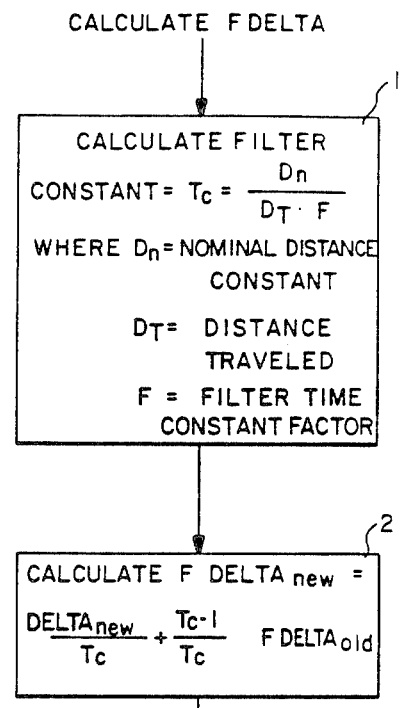

In the next step the F-DELTA is calculated utilizing the filter time constant factor F to calculated the filter time constant $T_C$ (block 8G). The flowchart for calculation of F-DELTA is shown in FIG. 8G.

Figure 8H:
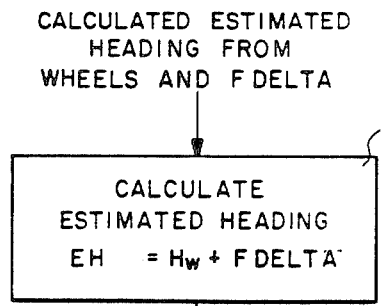

In the last step, the estimated heading EH is calculated from the wheels heading $H_W$ and F-DELTA. The algorithm for calculating the estimated heading EH is shown in FIG. 8H.

FIG. 8A shows the algorithm for the calculation of the heading from the compass $H_C$. In the first step, the outputs from the flux gate compass X1 and Y1 are read (block 1). In the next step, the compass offsets are compensated for by generating X2 equal to X1−X0 and Y2 equal to Y1−Y0; where X0 and Y0 are the compass offsets (block 2). In the next step, the heading component of the output from the compass is calculated (block 3). The heading component designated A is equal to arctangent (Y2,X2). In the next step, the compass deviation is compensated for in the heading A (block 4). This is accomplished by calculating B=A plus the deviation for the heading A. The deviation comes from a table created during calibration. In the final step, the compass rotation and magnetic variation are compensated for (block 5). This is accomplished by calculating $H_C=B-R+V$, where R is equal to the rotation of the compass and V is equal to the magnetic variation. The rotation term R is calculated during calibration and the magnetic variation term V is stored as part of the map data base.

FIG. 8B shows a flowchart for calculating a heading from the wheels $H_W$. The first step involves reading wheel pulses from the left and right wheels to determine the distance travelled by the left and right wheels respectively l, r (block 1). In the next step, the velocity V is calculated by adding l and r and dividing it by 2 (block 2). In the next step, the ratio R equal to (L−R)/V is calculated (block 3). Next, the effective wheel track T is determined from a look-up table based on the ratio R and velocity V (block 4). The lookup table is computed during calibration. The angle of the turn $\alpha$ is then calculated by multiplying (L−R)×$K_D$ and dividing the product by T, where $K_D$ is equal to a calibration factor for the wheel sensors (block 5). Finally, the wheel heading $H_W$ is set equal to the previous wheel heading plus $\alpha$ (block 6).

FIG. 8C is a flowchart showing the calculation of the compass error bounds $E_C$. In the first step, the outputs X1 and Y1 from the flux gate compass are read (block 1). In the next step, the compass offsets are compensated for (block 2). Next the magnetic field strength $B_M$ is calculated by taking the square root of $(x2^2+y2^2)$ (block 3). The magnetic field strength corresponds to the magnitude component of the output of the compass means. In the next step, factor D is calculated by taking the absolute value of $(D_M-B_E)/B_E$; where $B_E$ is equal to the magnetic field strength due to the earth from a look-up table (block 4). Finally, the compass error bounds $E_C$ is set equal to D×60° (block 5). FIG. 8D shows the calculation of the wheel sensor error bounds $E_W$. In the first step the heading change $\alpha$ is calculated from the wheels (block 1). Next the wheel sensor incremental error $E_{WI}$ is calculated equal to the absolute value of $\alpha \times K$; where K is equal to a constant about equal to 0.1 (block 2). Next step, the accumulated wheel sensor error $E_{WA}$ is set equal to $E_W+E_{WI}$ (block 3). Next a filter constant $F_E$ is set equal to $D_N/D_T$; where $D_N$ is equal to a nominal distance constant and $D_T$ is equal to the distance traveled by the vehicle since the last calculation (block 4). Last, the wheel sensor error bounds $E_W$ is set equal to $E_{WA}\times(F_E-1)/F_E$ (block 5).

FIG. 8E shows the calculation of the filter time constant factor F used in calculating the filter time constant $T_C$. In the first step the time weighted standard deviation SDD of DELTA is calculated (block A). The algorithm for the calculation of the time weighted standard deviation of DELTA SDD is set in FIG. 8E/A. In the next step the heading error is calculated $E_h=SDD\times K\times(E_W-E_C)$ where K is equal to a constant set by trial and error to maximize the accuracy of the apparatus (block 2). In the next step, $E_h$ is compared with zero (block 3). If $E_h$ is greater than zero, then the error is primarily due to the wheels of the differential odometer so the filter time constant factor F is calculated to equal $(E_h+K_1)/K_1$; where $K_1$ is equal to a constant (block 4). If $E_h$ is less than or equal to zero, then the error is primarily due to the output from the compass. Thus the filter time constant factor F is set equal to $K_2/(E_h+K_2)$; where $K_2$ is equal to a constant (block 5).

FIG. 8E/A shows the flowchart for the calculation for the time weighted standard deviation SDD. In the first step, the standard deviation of the three previous DELTA measurements $SD_N$ is calculated (block 1). In the next step the time weighted standard deviation SDD is calculated to equal $(1/T)\times SD_N+(T-1)/T\times SDD_O$; where T is about equal to 6 and $SDD_O$ is equal to the previously calculated SDD (block 2). In the next step, $SD_N$ is compared with SDD (block 3). If $SD_N$ is greater than SDD, then SDD is set equal to $SD_N$ (block 4). Otherwise SDD is left as calculated in block 2.

FIG. 8F shows the algorithm for determining whether to select the ADS signal from the compass or the map data base. In the first step, the software determines where the vehicle was on the map at the last update of the navigation algorithm (block 1). If the vehicle was not located on a particular street, then the heading is selected from the compass. However, if the vehicle was updated to the map, then the software determines whether a special map data base bit is set (block 2). The special map data base bit is set when the map indicates tha the vehicle is in an area where the heading signal $H_C$ from the compass is expected to be inaccurate. If the special map data base bit is not set then the heading is selected from the compass. If the special data base bit is set then the software determines whether the heading of the map agrees with the heading of the compass within a threshold (block 3). If the headings disagree, then the heading is selected from the compass. If they agree, then the heading is selected from the map data base and DELTA is recalculated to equal $H_M-H_W$; where $H_M$ is equal to the heading from the map and $H_W$ is equal to the heading from the wheels (block 4).

FIG. 8G shows the algorithm for the calculation of F-DELTA. In the first step the filter constant $T_C$ is calculated by setting it equal to $D_N/(D_T\times F)$; where $D_N$ is equal to a nominal distance constant, $D_T$ is equal to the distance travelled and F is equal to the filter time constant factor (block 1). In the next step, F-DELTA is calculated to equal (DEL- $TA_{new}/T_C) + ((T_C - 1)/T_C) \times F\text{-}DELTA_{old}$ as described above in the specification (block 2).

FIG. 8H shows the calculation of heading from the wheels and F-DELTA. The estimated heading EH is set equal to $H_W + F\text{-}DELTA$ (block 1).

Appendix A copyright 1985, ETAK, Inc. to the present application is a printout of a source code language program for carrying out the present invention which is provided for the purposes of providing an example of one embodiment of the present invention. The software in Appendix A includes the following subroutine modules:

(1) COUR MOD. This module determines the coefficient for the low pass filter which calculates FDELTA.

(2) SDEV. This module calculates standard deviation.

(3) STDEV. This module calculates standard deviation.

(4) DEVCORR. This module corrects the compass reading for elliptical deviation.

(5) DR. This module is the main dead reckoning program.

(6) ERRFLTR. This module implements a fast attack, slow decay filter.

(7) LFILTER. This module implements a single pole infinite impulse response digital filter.

(8) RDSENSOR. This module reads the magnetic field sensor and the wheel sensors.

(9) TRACK. This module calculates the Ackerman steering wheel track given left and right wheel distance.

(10) DRPUPDT. This module updates the dead reckoning position given the incremental change in vehicle position.

(11) DRCALC. This module calculates the incremental distance traveled and the incremental heading change given left and right wheel sensor readings.

IV. Conclusion

Apparatus 10 according to the present invention overcomes the problems of prior art sensors for generating accurate data regarding the heading of a land vehicle by eliminating errors in the signals generated in direction sensors. According to this apparatus and method, errors reflected in the absolute direction signal and the relative direction signal are minimized. Because the errors in the relative direction sensor are for the most part probabilistically independent and spectrally separated from magnetic anomaly-induced errors reflected in the absolute direction signal, the present invention is able to combine the signals to isolate and minimize the effects of the errors in generating accurate data regarding the heading of the vehicle.

The foregoing description of the preferred embodiment of the invention has been presented for the purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

Accordingly, further aspects and advantages of the present invention can be determined by a study of the specification, the appendix, the claims and the drawings.

What is claimed is:

1. An apparatus for generating data regarding a heading of a land vehicle, comprising:
    a plurality of sensor means for generating respectively a plurality of independent direction signals including heading information indicating a heading of the land vehicle, said plurality of independent direction signals respectively including errors having essentially independent spectral characteristics; and
    processing means, responsive to said plurality of independent direction signals, for generating an estimated heading of the land vehicle including
    means, responsive to a filter control signal, for filtering a subset of said plurality of independent direction signals according to the spectral characteristics of the errors included in at least one direction signal included in the subset; and means for generating said filter control signal in response to a parameter indicating an estimated error magnitude of the errors in at least one of the direction signals in the subset.

2. The apparatus of claim 1, wherein the subset includes one direction signal from the plurality of independent direction signals.

3. The apparatus of claim 1, wherein the subset includes all of the direction signals from the plurality of independent direction signals.

4. An apparatus for generating data regarding a heading of a land vehicle, comprising:
    a plurality of sensor means for generating respectively a plurality of independent direction signals including head information indicating a heading of the land vehicle, wherein said plurality of said independent direction signals includes errors; and
    processing means, responsive to said plurality of independent direction signals, for generating an estimated heading of the land vehicle including
    filter means, responsive to a filter control signal, for reducing the effects of said errors; and
    means for generating said filter control signal in response to a parameter indicating an estimated error magnitude of a subset of said plurality of direction signals.

5. The apparatus of claim 4, wherein the subset includes one direction signal from the plurality of independent direction signals.

6. The apparatus of claim 4, wherein the subset includes all of the direction signals from the plurality of independent direction signals.

7. An apparatus for generating data regarding a heading of a land vehicle, comprising:
    first sensor means for generating a first direction signal including heading information indicating a heading of the land vehicle and errors having primarily first spectral characteristics;
    second sensor means for generating a second direction signal including heading information indicating a heading of the land vehicle and errors having primarily second spectral characteristics that are different from said first spectral characteristics; and
    processing means, responsive to said first and second direction signals, for generating an estimated heading of the land vehicle, including
    first means for combining said first direction signal and said second direction signal to generate a combined error signal essentially isolating said first and second errors from said heading information;

filter means for filtering said combined error signal according to filter characteristics approximating said first spectral characteristics to generate a filtered error signal including essentially said second errors; and second means for combining said filtered error signal and said second direction signal to offset said second errors and thereby provide the estimated heading.

8. The apparatus of claim 7, wherein said filter means includes means, responsive to a filter control signal, for varying said filter characteristics; and means for generating said filter control signal in response to said first direction signal and said second direction signal.

9. An apparatus for generating data regarding a heading of a land vehicle, comprising:

first means for generating a relative direction signal having a heading component indicating a heading direction for the land vehicle relative to a prior heading of the land vehicle and an error component;

second means for generating an absolute direction signal having a heading component indicating a heading direction for the land vehicle relative to the earth and an error component; and processing means, responsive to said absolute direction signal and said relative direction signal, for generating an estimated heading of the vehicle, including filter means, responsive to a filter control signal, for filtering said error components in said absolute direction signal and said relative direction signal to reduce said error components; and means for generating said filter control signal in response to a parameter indicating an estimated magnitude of the error component in at least one of said absolute direction signal and said relative direction signal.

10. The apparatus of claim 9, wherein:

said parameter indicates an estimated magnitude of a combination of the error components of said relative direction signal and said absolute direction signal.

11. The apparatus of claim 9, wherein said second means comprises:

compass means for generating a compass signal indicating the heading of the land vehicle relative to the magnetic field of the earth.

12. The apparatus of claim 9, wherein said second means comprises:

compass means for generating a compass signal indicating the heading of the land vehicle relative to the magnetic field of the earth and including a magnitude component; and further including means for generating said parameter by detecting fluctuations in said magnitude component of said compass signal relative to the expected magnitude of the magnetic field of the earth.

13. The apparatus of claim 12, wherein said means for generating said parameter includes:

means for receiving the magnitude component of the compass signal generated by said compass means;

means for storing a table of expected magnitudes of the magnetic field of the earth for a set of directions;

means for comparing the magnitude component of the compass signal generated by said compass means with the expected magnitude of the magnetic field of the earth from said table to generate a difference signal; and means responsive to said difference signal to generate said parameter.

14. The apparatus of claim 10, wherein said second means comprises:

compass means for generating a compass signal having a directional component indicating the heading of the land vehicle; and further including means for combining said relative direction signal and the directional component of said compass signal to generate a combined error signal; and means for generating a deviation statistic over a sequence of signal measurements indicating deviation of said combined error signal from an average over said sequence of signal measurements; and means responsive to said deviation statistic for generating said parameter.

15. The apparatus of claim 9, wherein said first sensor means comprises:

differential odometer sensor means for generating said relative direction signal.

16. The apparatus of claim 9, wherein said first means comprises:

differential odometer sensor means for generating said relative direction signal; and further including means for generating said parameter by measuring the velocity and ratio of turn of said vehicle.

17. The apparatus of claim 9, wherein said second means comprises:

compass means for generating compass heading data indicating the heading of the land vehicle relative to the direction of the magnetic field of the earth;

means for providing a map data base including entries identifying a street segment and a predicted heading of a land vehicle on the street segment identified in the entry;

selector means, responsive to a selection signal, for selecting said compass heading data or a predicted heading in a map data base entry as said absolute direction signal; and selector control means for supplying said selection signal.

18. The apparatus of claim 17, wherein said selector control means is responsive to a first parameter, and further including:

means for generating the first parameter in response to the difference between an estimated heading of the land vehicle and the predicted heading identified in a map data base entry.

19. The apparatus of claim 17, wherein said selector control means is responsive to a first parameter, and the map data base entries further include an error flag that is set when the compass heading data is expected to be inaccurate for the street segment identified in the entry, and further including:

means for supplying the error flag as said first parameter for selection of said predicted heading identified in the map data base entry when the vehicle is located on the street segment.

20. The apparatus of claim 17, wherein said selector control means is responsive to a first parameter, and further including:
   means for storing data identifying map data base entries identifying street segments in geographic locations having characteristics which cause said compass means to be inaccurate; and
   means for supplying said first parameter for selection of said predicted heading identified in the map data base entry when the vehicle is located within one of said geographic locations.

21. The apparatus of claim 17, further including:
   a vehicle navigation system for locating the land vehicle; and
   said selection signal is supplied to said vehicle navigation system as a parameter used in locating the land vehicle.

22. The apparatus of claim 9, wherein said second means comprises:
   compass means for generating compass heading data indicating heading of the land vehicle relative to the direction of the magnetic field of the earth;
   means for providing a map database including entries identifying a street segment and a predicted heading of a land vehicle on the street segment;
   means, in communication with the compass means and the means for providing a map database and responsive to a control signal for supplying said absolute direction signal based on the compass heading data, and a predicted heading identified in a map database entry; and
   control means for supplying said control signal.

23. The apparatus of claim 17, further including:
   means for supplying to the selector means an entry in the map data base that identifies the street segment on which the land vehicle is located.

24. An apparatus for generating data regarding a heading of a land vehicle, comprising:
   first means for generating a relative direction signal having a heading component indicating a heading direction for the land vehicle relative to a prior heading of the land vehicle and an error component;
   second means for generating an absolute direction signal having a heading component indicating a heading direction for the land vehicle relative to the earth and an error component; and
   processing means, responsive to said absolute direction signal and said relative direction signal, for generating an estimated heading of the vehicle, including
   filter means, responsive to a filter control signal, for filtering high frequency errors from said absolute direction signal and low frequency errors from said relative direction signal; and
   means for generating said filter control signal in response to a plurality of parameters indicating an estimated accuracy of said second means and said first means.

25. An apparatus for generating data regarding a heading of a land vehicle, comprising:
   first means for generating a relative direction signal having a heading component indicating a heading direction for the land vehicle relative to a prior heading of the land vehicle and an error component;
   second means for generating an absolute direction signal having a heading component indicating a heading direction for the land vehicle relative to the earth and an error component; and
   processing means, responsive to said absolute direction signal and said relative direction signal, for generating an estimated heading of the vehicle, including
   first means for combining said relative direction signal and said absolute direction signal to generate a combined error signal indicating the difference between said relative direction signal and said absolute direction signal;
   filter means for filtering relatively high frequency errors from said combined error signal to generate a filtered error signal; and
   second means for combining said filtered error signal and said relative direction signal to generate an estimated heading of the land vehicle.

26. In a vehicle navigation system for automatically tracking a motor vehicle movable over a given area identified by a map, an apparatus for generating an estimated heading of the motor vehicle, comprising:
   first means for generating a relative direction signal including heading information indicating a heading direction of the motor vehicle relative to a prior heading of the motor vehicle and including first errors;
   second means for generating an absolute direction signal including heading information indicating a heading direction for the motor vehicle relative to the earth and including second errors, said second means including
   compass means for generating compass heading data indicating the heading of the motor vehicle relative to the earth,
   means for providing a map data base including entries, each identifying a street segment and a predicted heading of a motor vehicle on the street segment,
   means, in communication with said compass means and said means providing a map data base and responsive to a control signal, said compass heading data or a predicted heading identified in a map data base entry, for supplying said absolute direction signal, and
   means, for supplying said control signal;
   first combining means for subtracting said relative direction signal from said absolute direction signal to generate a combined error signal;
   filter means, responsive to a filter control signal, for filtering said combined error signal to essentially cancel said second errors and generate a filtered error signal, said filter means including
   means for generating said filter control signal in response to at least one parameter indicating the estimated magnitude of at least one of said first and second errors; and
   second combining means for adding said filtered error signal to said relative direction signal to essentially cancel said first errors in said relative direction signal to generate the estimated heading of the motor vehicle.

27. An apparatus for generating an estimated heading of a land vehicle, comprising:
   first means for generating a relative direction signal having a heading component indicating a heading direction for the land vehicle relative to a prior heading of the land vehicle and an error component;

second means for generating an absolute direction signal having a heading component indicating a heading direction for the land vehicle relative to the earth and an error component;

processing means, in communication with the first means and the second means, for generating the estimated heading of the land vehicle including means, responsive to a parameter, for assigning weights to the relative direction signal and the absolute direction signal;

means for combining the relative direction signal and the absolute direction signal according to the assigned weights, and means for supplying the parameter in response to an estimated magnitude of the error component of one of said absolute direction signal or relative direction signal.

28. The apparatus of claim 27, wherein said means for generating said parameter is further responsive to the estimated magnitude of the error components of both the absolute direction signal and the relative direction signal.

29. An apparatus for generating data regarding a heading of a land vehicle, comprising:

a plurality of sensor means for generating respectively a plurality of independent direction signals including heading information indicating a heading of the land vehicle, said plurality of independent direction signals respectively including errors having essentially independent characteristics; and processing means, responsive to said plurality of independent direction signals, for generating an estimated heading of the land vehicle including means responsive to a filter control signal for filtering a subset of said plurality of independent direction signals according to the characteristics of the errors including in at least one direction signal included in the subset; and means for genrating said filter control signal in response to a parameter indicating a selected characteristic of errors in at least one of the direction signals in the subset.

* * * * *

UNITED STATES PATENT AND TRADEMARK OFFICE
CERTIFICATE OF CORRECTION

PATENT NO. : 4,734,863
DATED : March 29, 1988
INVENTOR(S) : STANLEY K. HONEY, KENNETH A. MILNES, WALTER B. ZAVOLI It is certified that error appears in the above-identified patent and that said Letters Patent is hereby corrected as shown below:

In Column 6, line 41, at the end of the line, that portion of the formula reading "(H+D+R-" should read --(H+D+R)--; Column 6, line 42, that portion of the formula reading ")=A-(D+R)" should read -- =A-(D+R) --.

In Column 7, line 19, delete "RDS(ss)" and insert therefor --RDS(s)--; Column 7, line 64, that portion of Equation 9 at the end of the line reading "+$X_N(s)F_N(s)$" should read -- + . . . $X_N(s)F_N(s)$ --.

In Column 8, line 16, delete "or" and insert therefor --for--.

In Column 14, line 28, delete "streel" and insert therefor --steel--.

In Column 15, line 54, Equation 15, that portion of the formula reading "a = arctan [$Y_2$" should read -- a = arctan [($Y_2$ --.

In Column 17, line 6, delete "calculated" and insert therefor --calculate--.

In Column 26, line 18, delete "genrating" and insert therefor --generating--.

Signed and Sealed this

Eleventh Day of October, 1988

*Attest:*

DONALD J. QUIGG

*Attesting Officer*   *Commissioner of Patents and Trademarks*